United States Patent [19]

Viberg et al.

[11] Patent Number: 4,495,016
[45] Date of Patent: Jan. 22, 1985

[54] METHOD OF MAKING A PACKING LAMINATE WEB

[75] Inventors: Rolf Viberg, Bjärred; Göran Harrysson, Lund; Tom Kjelgaard, Löddeköpinge, all of Sweden

[73] Assignee: Tetra Pak International AB, Lund, Sweden

[21] Appl. No.: 452,831

[22] Filed: Dec. 23, 1982

[30] Foreign Application Priority Data

Dec. 29, 1981 [SE] Sweden .............................. 8107824

[51] Int. Cl.³ ...................... B32B 31/04; B32B 31/20; B32B 31/30
[52] U.S. Cl. .............................. 156/152; 156/244.11; 156/244.26; 156/244.27; 156/249; 428/40
[58] Field of Search ............... 156/152, 230, 233, 235, 156/238, 239, 241, 249, 244.11, 244.26, 244.27; 428/40, 41, 42

[56] References Cited

U.S. PATENT DOCUMENTS 3,279,966 10/1966 Calvert .............................. 156/249
4,270,965 6/1981 Torterotot et al. ................ 156/152
4,424,260 1/1984 Pupp .................................. 428/40

Primary Examiner—Caleb Weston
Attorney, Agent, or Firm—Burns, Doane, Swecker & Mathis

[57] ABSTRACT

The invention relates to a packing laminate web with a protective layer which is applied during the manufacture of the laminate web to one, sterile side of the web. When the laminate web is to be converted to aseptic packing containers the protective layer is detached and is transferred to the opposite side of the laminate web where it serves as an external plastic layer. The invention also comprises a method for the manufacture and conversion of the packing laminate web.

7 Claims, 4 Drawing Figures

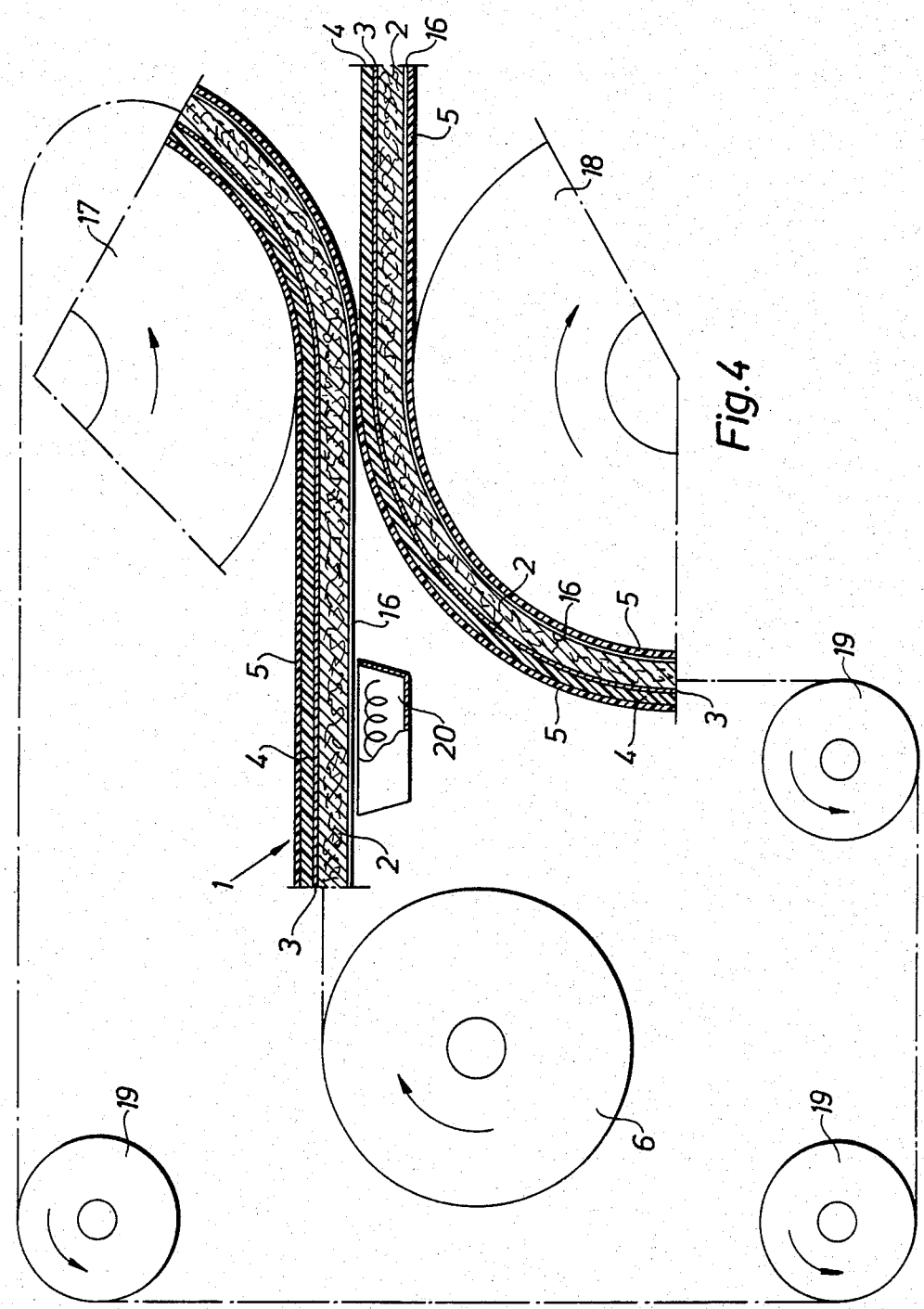

METHOD OF MAKING A PACKING LAMINATE WEB

BACKGROUND AND SUMMARY OF THE PRESENT INVENTION

The present invention relates generally to laminate webs. More specifically, the present invention relates to a packing laminate web with a protective layer and a method for the manufacture and conversion of such a packing laminate web.

Aseptic packing containers of the non-returnable type used e.g. for sterilized juice or milk are generally made of plastics or plastic-laminated material. The packing material must be sterile or sterilized before it is filled with the desired contents, if packing containers of long keeping quality are to be obtained.

In the manufacture of e.g. milk packages a laminated material in the form of a web is used. The web includes a carrier layer of paper which, on the side facing the contents, is provided with a layer of aluminium foil and an external layer of thermoplastic material. The opposite side of the carrier layer is also covered with a thin layer of thermoplastic. The packing laminate is sterilized immediately before, or during, the conversion to packing containers by being brought into contact with a sterilizing substance, usually hydrogen peroxide, and also by being subjected to heat. After the sterilizing agent has been removed again, the laminate is formed to a tube by folding over and joining in a liquid-tight manner the longitudinal edges of the laminate web. After filling of the tube with the desired contents, the tube is sealed off by transverse seals placed at equal intervals so that individual packing containers filled with sterile contents are produced.

In this and similar methods of manufacture it is also possible to use a presterilized web in rolled-up form. This is supplied in a closed wrapping or a cassette which is inserted into the packing machine, whereupon the laminate web is rolled off and is converted to filled packing containers in the manner described above. In doing this, the whole forming process naturally has to take place in a closed sterile chamber, so as to prevent re-infection of the packing material during the manufacture of the filled packing containers.

This latter method brings with it certain advantages in that it renders unnecessary any use of a sterilizing agent in connection with the forming and filling of the packing containers. On the other hand, the handling of the sterilized packing material is critical, since in order to guarantee sterility, every care must be taken to ensure that from the instant of sterilization right to, and including the final forming of the filled packing containers, the material does not come into contact either with nonsterile objects or with bacteria present in the surrounding atmosphere. This means in practice that after the sterilization every packing laminate has to be kept in a hermetically closed cassette, wherein it can be stored or transported to the packing machine. Moreover, the packing machine must be provided with a sterile chamber including some form of sluice which allows connection of the cassette. Since a very great number of cassettes is required, the method becomes expensive and this, together with the complicated handling procedure, is the reason that aseptic packing machines operate less frequently with presterilized webs, but instead are supplied with non-sterile webs which are sterilized by chemical agents and heat prior to conversion to individual packages.

It is an object of the present invention to provide a packing laminate, web as well as a method for the manufacture and conversion of the same, this method making it possible to avoid the aforementioned disadvantages, and to indicate a simpler technique for the manufacture of sterile packing containers from a packing material web which has been sterilized beforehand.

It is a further object of the present invention to provide a sterile packing laminate intended for the manufacture of sterile packing containers, which is insensitive to surrounding bacteria and which, therefore, can be handled without being enclosed in bacteria proof cassettes or other closed wrappings.

It is a further object of the present invention to provide a method for the manufacture of the sterile packing laminate web, this method being simple and reliable and capable of being carried out without appreciable wastage and also with minimum other costs.

These and other objects of the present invention have been achieved by a packing laminate which is in the form of a primary web, a protective layer being joined to the first side of the web in a detachable but bacteria-proof manner. The packing laminate, before conversion to packing containers, is arranged to be converted to a secondary web, the protective layer being transferred and joined to the other side of the web.

A method for the manufacture of a packing laminate web of this type includes coating the packing laminate on one side by extrusion with a thermoplastic layer forming the protective layer.

A method for the conversion of such a packing laminate web includes delaminating the protective layer from one side of the packing laminate web and transferring it to the other side of the packing laminate web.

Preferred embodiments of the packing laminate web as well as of the method for the manufacture and conversion of the same have been given the characteristics which are evident from the description below.

BRIEF DESCRIPTION OF THE DRAWINGS

Preferred embodiments of the packing laminate web and of the method for the manufacture and conversion of the same will now be described in more detail with special reference to the enclosed schematic drawings which only illustrate the details required for the understanding of the invention.

FIG. 4 is an enlarged side view of a second embodiment of the course of the conversion according to the invention.

DETAILED DESCRIPTION OF THE PREFERRED EMBODIMENTS

Figure 1:
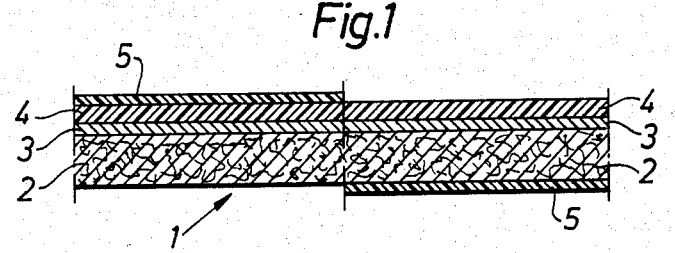
FIG. 1 is an enlarged cross-sectional view through a part of a packing laminate web in accordance with the invention before and after the conversion respectively.

The packing laminate 1 shown in FIG. 1 includes a carrier layer 2 of fibrous material, preferably paper. The carrier layer has a thickness of approx. 0.4 mm and its chief task consists in giving the packing laminate the desired stiffness and stability. The carrier layer may also consist of other material, e.g. foamed thermoplastic. The impermeability of the packing laminate to gas and light is generally improved with the help of a thin aluminium foil layer 3, which is firmly combined with the fibrous material with the help of an adhesive agent (not shown). The aluminium foil 3 is placed on the side of the fibrous material which subsequently will face towards the contents, that is to say the side facing upwards in FIG. 1.

The carrier layer 2 is provided, moreover, with a first plastic layer 4, which consists of a thermoplastic material, which is laminated and firmly joined to the surface of the carrier layer 2 covered with aluminium foil. The plastic layer 4 has a thickness of approximately 0.06 mm in the primary form of the laminate which is shown in the lefthand part of FIG. 1.

A further layer of thermoplastic is joined in a detachable manner to the first plastic layer 4 and thus forms a second plastic layer which serves as a protective layer or protective film 5 which prior to the conversion of the laminate wholly covers the free surface of the first plastic layer, facing away from the carrier layer 2. After the conversion of the material, the protective layer 5 instead is applied and joined to the opposite side of the material, as shown in the righthand part of FIG. 1, where the secondary form of the material is shown. This second plastic layer or protective layer 5 has a thickness which amounts substantially to half the thickness of the first plastic layer. The first as well as the second plastic layer consists of a thermoplastic material, e.g. polyethylene. It is also possible to choose, in particular for the second plastic layer or protective layer 5, another thermoplastic, e.g. polystyrene or polypropylene. Between the two plastic layers 4, 5 a further material layer (not shown) may be present whose function is to regulate the sealing and which thus serves to control the adhesion between the two plastic layers so that the desired predetermined lamination strength is obtained.

Since the two plastic layers 4, 5 are applied to the carrier layer 2 during the manufacture of the laminate by extrusion at high temperature, the surfaces of the two layers 4, 5 facing one another remain free from bacteria and consequently sterile. Owing to the surfaces being joined to one another a break in the sterility is prevented when the plastic layers, after the extrusion, cool down again to a temperature where bacteria can survive.

The manufacture of the packing laminate web in accordance with the invention is initiated by a web of the fibrous carrier layer 2 being covered in conventional manner with a layer of aluminium foil 3 on one of its sides. Then the carrier layer is permitted to pass an extruder for the joint extrusion of the two plastic layers 4 and 5. The first, thicker plastic layer 4 is extruded in this case at such a temperature that after the laminate web has passed between a pair of conventional pressure rollers (not shown) it is firmly combined with the surface of the carrier layer 2 which is covered with the aluminium foil 3. Due to the joint extrusion, the second plastic layer 5 (protective layer) is also applied onto the first plastic layer 4. In this case the extrusion temperature chosen is such that after the laminate web has passed the pressure rollers, the second plastic layer is given an adhesion to the first plastic layer 4 so that during a later stage of the manufacturing process it can be detached again from the same. However, the joint between the two plastic layers must be sufficiently good so that bacteria cannot enter between the plastic surfaces facing each other.

The extrusion temperatures which are used in the extrusion of the two plastic layers are so high that any bacteria between the two layers are certainty destroyed, with the result that the surfaces of the two layers facing each other will be completely sterile. The actual extrusion temperature will have to be adapted, of course, to the different types of thermoplastic material which are used, but the extrusion temperature used is still sufficiently high with all types of thermoplastics that any conceivable types of bacteria will be destroyed with a good margin of safety. The sterile surfaces facing towards each other are now tightly joined together which renders it impossible for bacteria or other contaminations to penetrate between the protective layer 5 and the layer 4. Thus the material can be handled without special protective measures (such as impermeable wrappings or the like) and is treated in principle just like a non-sterile packing material without the sterility being broken.

As mentioned earlier, the two plastic layers 4, 5 may consist of any thermoplastic material and combinations of different thermoplastics may also be used. The thermoplastic used most commonly at present for the packaging of foodstuffs is polyethylene and this plastic is also very appropriate for use in the manufacture of the packing laminate in accordance with the invention. In order to prevent excessive adhesion between the layers, in cases where they consist of the same thermoplastic material, it may be necessary to apply the layers 4, 5 separately at spaced time intervals and to apply between the layers a thin layer of some other plastic material, e.g. polystyrene to regulate the sealing. When the two layers 4, 5 are manufactured of different types of thermoplastics, e.g. polyethylene-polystyrene or polyethylene-polypropylene, a less strong adhesion is obtained automatically, so that in such cases a layer regulating the sealing is generally dispensed with. The desired strength of adhesion is obtained here instead by adaptation of the temperature and compression force between the layers.

A suitable adhesion between two layers of the same plastic material may also be achieved by applying the film deposited last at a lower temperature. However, if this temperature has to be so low that there is a risk of not completely killing the bacteria, it may be appropriate to after-sterilize the material by means of a sterilizing method with depth action, e.g. using an electron gun.

After the application of the two plastic layers 4, 5 onto the side of the carrier layer 2, the free surface of the carrier layer 2 or of the protective layer 5 may be provided with a thin layer of a heat-activatable adhesive (not shown in FIG. 1). The adhesive, which like the plastic layers can be applied by extrusion, may consist of a heat-meltable glue, a so-called hot-melt, or any known type of sealing varnish which may be hot or cold sealing.

The packing laminate web 1 has now been provided with all the desired material layers and is rolled up subsequently to a roll 6. Prior to the rolling-up the packing laminate web possibly may be divided into a number of narrower webs by longitudinal cuts or it may be subjected to any other desired processing.

Figure 2:
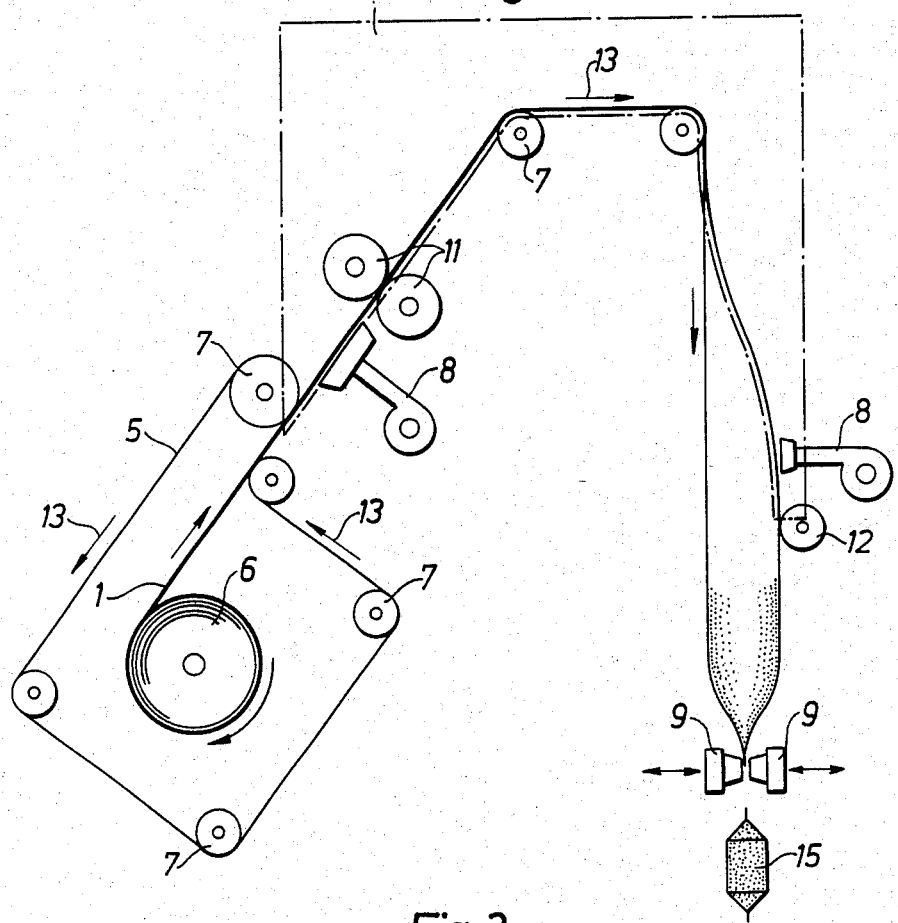
FIG. 2 is a side view of a first embodiment of the course of the conversion according to the invention as it can be carried out in a packing process of known type.

When the packing material web 1 is to be used and converted in a packing machine to individual sterile packing containers, the material roll 6 (FIG. 2) is placed into a roll stand (not shown) in a packing machine. The packing machine is of the known type which during the advancing of a packing laminate web through the machine successively converts the same to tubular form by sealing together the two longitudinal edges of the web. After filling of the tube with the desired contents, the same is sealed off in repeated, transverse zones, so that individual, filled packing containers are produced. Aseptic packing machines of this type have been known for a long time and are not, therefore, described in detail. In FIG. 2 the method in accordance with the invention is shown diagrammatically. The path of the packing material web through a packing machine is also illustrated with certain parts of the packing machine which control and process the web being indicated. Among other things a number of guide rollers 7 for the material web are shown, two hot-air units 8 for the hot-sealing of the material, as well as reciprocating sealing jaws 9 co-operating with one another. The extent of a sterile chamber 10, in which at least the sterile side of the packing material web is located during the conversion of the material web to tubular form, is also indicated by dash-dotted lines. The sterile chamber is fed by conventional arrangements (not shown) with sterile air under pressure so as to prevent penetration of bacteria. Finally in FIG. 2 are also shown two co-operating pressure rollers 11, and a pressure roller 12 for the sealing of the longitudinal joint of the packing material tube. The direction of movement of the material is shown by a number of arrows 13.

Figure 3:
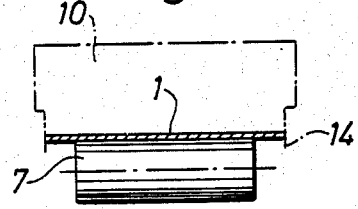
FIG. 3 is a section through a part of FIG. 2.

When the production of aseptic packing containers in accordance with the method according to the invention is to be started, a roll 6 with the packing laminate web in accordance with the invention is placed into the packing machine, whereupon the front end of the material web is manually conducted through the machine up to the region where the individual packing containers are formed and separated from the packing material web with the help of forming and sealing jaws 9, which also advance the material through the packing machine. When the packing material web in accordance with the invention is rolled off the roll 6, the web 1 is in the form of a primary web, that is to say its protective layer 5 is situated on top and covers the plastic layer 4, which later faces the inside of the packing containers, so that its sterility is maintained. In other words, the cross-section of the packing material web 1 has the appearance as shown in the lefthand part of FIG. 1. After the primary web has been wound off the roll 6 it runs freely in the surrounding atmosphere up to an input opening in the sterile chamber 10 designed as an air sluice. At the input opening, a guide roller 7 delaminates the protective layer 5 of the web from the adjoining plastic layer 4. At the same time, the material web passes into the sterile chamber in such a manner that its now exposed sterile thermoplastic layer 4 is protected inside the sterile chamber (FIG. 3). The stripped-off protective layer 5 passes around the guide roller 7, present at the input opening of the sterile chamber 10 and serving as a reversing roller, and is passed with the help of further guide rollers 7 around the packing laminate roll 6 to be rejoined with the laminate web 1 again at some distance past the roll 6 (seen in the direction of movement of the laminate web). The protective layer 5 is then joined to the opposite side of the laminate web, that is to say to the free surface of the carrier layer 2, so that a secondary web of an appearance as shown in the righthand part of FIG. 1 is produced. In order to facilitate the attachment of the protective layer 5 to the free surface of the carrier layer 2, the latter or else the protective layer may be coated with a thin layer of heat-meltable material, e.g. so-called hot-melt (not shown in the drawing). The protective layer 5 and the laminate web 1 or possibly the hot-melt layer are then heated with the help of a hot-air unit 8 to such a temperature that a heat-sealing is produced, whereupon the material web and the protective layer are allowed to pass between pair of pressure rollers 11 which, with simultaneous cooling, press together the layers so that they are joined to each other.

As can be seen from FIG. 3, which shows a section through the sterile chamber 10 and a guide roller 7 in the upper part of the packing machine where the laminate web 1 runs substantially horizontally, the sterile side of the laminate web is inside the sterile chamber 10. With the help of flexible lip seals 14, which rest against the packing laminate web 1, it is ensured that the interior of the sterile chamber 10 remains sterile. At the same time, the opposite, non-sterile side of the packing material web remains free and accessible from the outside, thus making possible simple processing and guiding of the web.

After the packing laminate web has been provided with the protective layer 5 on its external side and has passed the upper part of the machine, where any further processing operations can take place, the web is guided substantially vertically downwards through the machine with conversion at the same time to the form of a hose or tube with the help of forming elements, not shown but well known to those versed in the art. The tube formation is completed by heating of the longitudinal edges of the packing laminate web with the help of a second hot-air unit 8 and subsequent pressing together with the help of internal and external pressure rollers 12. After sealing of the longitudinal edges, the packing material tube leaves the sterile chamber 10 at the same time as it is filled by supply lines (not shown) with sterile contents. The filled tube then approaches the continuously operating reciprocating sealing jaws 9, which compress the tube in transverse zones underneath the contents level and heat-seal the parts of the laminate in contact with one another in the zones. Subsequent cutting then divides the packing material tube into individual, substantially cushion-shaped packing containers 15, which, after possible further shaping processes, are ready for transport and distribution to sales points.

Printing in the form of decoration or goods description, normally found on the outside of the finished packing containers, can be applied in accordance with the invention to the free, external side of the carrier layer 2 while the packing laminate is in primary form. The transfer and application of the protective layer 5 onto the external side will ensure that the printed surface is protected against injury. The printing may be observed unhindered through the protective layer, in all cases where the same consists of polyethylene which can be made crystal-clear and transparent without any difficulty. In those cases, where for any reason the protective layer cannot be made completely transparent, it is also possible to apply the printing onto the protective film. Here it will be necessary, however, to turn the protective film during the transfer between the two sides of the laminate web, so that the same layer-side faces towards the laminate web both before and after the transfer, since otherwise the print will no longer be clearly visible when the material web is in the form of a secondary web.

Although it is theoretically conceivable to join the protective layer 5 to the carrier layer 2 by heating of the protective layer or the laminate web to sealing temperature before the application, it will be most appropriate in general to make use of an adhesive e.g., as already mentioned, a so-called hot-melt. This adhesive may be supplied of course to the space between the other side of the laminate web and the protective layer directly before the joining together of the same, but it is also possible, as mentioned previously, to apply a layer of adhesive to the laminate web during the manufacture of the same.

The method in accordance with the invention described above for the conversion of the material web from a primary web to a secondary web may be varied in different ways, e.g. in that not only the protective layer 5, but also other layers are transferred from one side of the material web to the other side. In order to avoid the transfer of the thin protective layer 5 which is difficult to handle, in particular at high conversion speeds it is possible in accordance with a second embodiment of the conversion procedure to guide around not only the protective layer, but also the complete material web, thus giving stability to the protective layer and making it possible appreciably to increase the conversion speed. This second embodiment of the conversion procedure is illustrated in FIG. 4, where the path of movement of the material web during the conversion is illustrated schematically. A portion of the figure shows on a larger scale the actual transfer of the protective layer from one side of the material web to its other side. As is evident from the figure, a material web 1 of substantially the same type as described earlier is used. The material web is supplied to a packing machine in the form of a roll 6 from which the material web is rolled off. The material web 1, like the earlier material web, includes a carrier layer 2 of e.g. paper. The carrier layer is provided on its one side, subsequently facing towards the interior of the packing container, with a layer 3 of aluminium foil, a first plastic layer 4 and a protective layer 5 applied onto the same. The free surface of the carrier layer 2 is covered by a further layer 16 of heat-meltable adhesive, e.g. a so-called hot-melt. The different types of layers, types of material and thicknesses of material of the material web 1 may correspond wholly or partly with what has been described in connection with the first-mentioned embodiment of the conversion procedure in accordance with the invention, and any further detailed description of the material, therefore, should not be necessary.

After the material web 1 has been wound off the roll 6, the material web passes over a cooled pressure roller 17 serving as a guide roller which is arranged opposite a similar roller 18. The rollers 17, 18 are movable in a direction towards or away from one another, so as to make possible the regulation of the pressure upon the material web running in the nip between the rollers. After the material web 1 running off the roll 6 has passed between the rollers 17, 18, it is guided via the roller 17 and the further guide rollers 19 around the roll 6 or in some other manner, e.g. by a guide roller placed at an angle (not shown), around the part of the web running off the roll 6 until the material web, with its front end, reaches the roller 18 and can be guided again into the nip between the rollers 17, 18. The material web thus will pass the nip between the rollers 17, 18 twice, which makes it possible to transfer at this instant one or more layers from the one part of the web to the other.

The first part of the web, or the primary web, running off the roll 6 is provided, as has already been mentioned, on its one side with a protective layer 5 which covers the sterile surface of the plastic layer 4 located underneath it. The layer 16 of heat-meltable glue, situated on the opposite side of the primary web, is heated just before the primary web passes into the nip between the rollers 17, 18 with the help of a heating unit 20, which e.g. may be of the infrared type. When the glue layer 16 reaches the nip between the rollers 17, 18 it is thus in a molten state, which means that the two parts of the web, which are situated simultaneously in the nip, will be firmly glued to one another. More particularly, the outer protective layer 5 facing upwards of the part of web passing over the roller 18 will be glued firmly to the hot-melt surface of the material web passing over the roller 17, so that the protective layer 5 follows once more together with this web around the roller 17, via the guide rollers 19 and over the roller 18. The protective layer has been transferred thereby to the opposite side of the material web, and a secondary web with an external, sterile plastic layer can be introduced into a sterile chamber in the packing machine. The exposure of the sterile surface takes place in the nip between the two rollers 17, 18 and the input opening of the sterile chamber, therefore, has to be situated at the same level as the nip, which for reasons of clarity is not shown in FIG. 4.

Through the second conversion method in accordance with the invention it is possible to guide around not only the protective layer 5, but also a further, complete primary web, which facilitates the handling and reduces the risk of stretchings or breaks at high conversion speeds. After the material web converted to a secondary web has passed into the sterile chamber, the further conversion to a material tube, the filling with contents and the conversion to individual, sealed packing containers can be done in a manner similar to that described in connection with the embodiment discussed earlier. Also other, further processing may take place.

The packing laminate and the method for the manufacture and conversion of the same in accordance with the invention provide a problem-free and simple handling of the sterile material which in practice can be handled in the same simple manner as a non-sterile material. This has not been possible with earlier types of pre-sterilized material webs. Through the utilization of the second plastic layer, on the one hand as a protective layer for the sterile surface of the packing laminate and on the other hand as an external plastic layer, an appreciable saving of material occurs which is favorable from a point of view of costs.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A method for converting a packing laminate web to a secondary web with a sterile surface, comprising the steps of:

extruding a detachable protective layer on to a first side of said packing laminate web to form the primary web, said protective layer maintaining said first side in a sterile condition;

delaminating said protective layer from said first side while maintaining said first side in the sterile condition; and transferring said protective layer to a second side of said packing laminate, said protective layer being secured to said second side to form said secondary web;

wherein, before the protective layer is delaminated, the laminate web is guided around a first of a pair of cooperating pressure rollers and then into a nip between said pressure rollers, where a transfer of the protective layer takes place, so that a laminate web in a secondary form is obtained after the web has passed between the pressure rollers for a second time.

2. The method in accordance with claim 1, wherein an adhesive applied to the side of the primary web not provided with protective film is activated before the pressing together of the webs in the nip between the pressure rollers.

3. The method in accordance with claim 2, wherein an adhesive is activated by heating.

4. The method in accordance with claim 3, wherein the adhesive is cooled again in the nip between the rollers.

5. A method for converting a packing laminate web to a secondary web having a sterile surface, comprising the steps of:

forming a detachable protective layer onto a first side of said packing laminate web and covering the opposite side of said packing laminate web with an adhesive to form a primary web, said protective layer maintaining said first side in a sterile condition;

dispensing said primary web over a first pressure roller of a pair of opposing pressure rollers, the adhesive covered side of the dispensed primary web facing the opposing pressure roller to define a nip therebetween; and further guiding said primary web to pass through said nip with the side of the guided primary web covered by the detachable protective layer bearing against the adhesive covered side of the dispensed primary web so that the protective layer from the guided primary web is transferred onto the dispensed primary web to thereby form a second web from the guided primary web.

6. The method in accordance with claim 5 wherein said adhesive is activated during said dispensing step.

7. The method in accordance with claim 6 wherein the adhesive is activated by heating.

* * * * *